(12) United States Patent
Cabanas Corrales et al.

(10) Patent No.: US 11,118,091 B2
(45) Date of Patent: *Sep. 14, 2021

(54) METHOD OF A HEAT TRANSFER OF A NON-METALLIC OR METALLIC ITEM

(71) Applicant: ArcelorMittal, Luxembourg (LU)

(72) Inventors: Maria Cabanas Corrales, Oviedo Asturias (ES); David Noriega Perez, Oviedo Asturias (ES)

(73) Assignee: ArcelorMittal, Luxembourg (LU)

( * ) Notice: Subject to any disclaimer, the term of this patent is extended or adjusted under 35 U.S.C. 154(b) by 446 days.

This patent is subject to a terminal disclaimer.

(21) Appl. No.: 16/064,808

(22) PCT Filed: Dec. 20, 2016

(86) PCT No.: PCT/IB2016/001785
§ 371 (c)(1),
(2) Date: Jun. 21, 2018

(87) PCT Pub. No.: WO2017/109561
PCT Pub. Date: Jun. 29, 2017

(65) Prior Publication Data
US 2018/0371304 A1    Dec. 27, 2018

(30) Foreign Application Priority Data

Dec. 22, 2015 (WO) .................. PCT/IB2015/002393

(51) Int. Cl.
*C09K 5/10* (2006.01)
*B22D 11/124* (2006.01)
(Continued)

(52) U.S. Cl.
CPC ............ *C09K 5/10* (2013.01); *B22D 11/1245* (2013.01); *C21D 1/56* (2013.01); *C21D 1/60* (2013.01); *C21D 1/667* (2013.01); *C21D 1/00* (2013.01)

(58) Field of Classification Search
CPC ...... B22D 11/1245; C21D 1/56; C21D 1/667; C09K 5/10; C01B 32/182; B82Y 30/00
See application file for complete search history.

(56) References Cited

U.S. PATENT DOCUMENTS 8,834,739 B1    9/2014 Cumberland et al.
2003/0062147 A1    4/2003 Schoen et al.
(Continued)

FOREIGN PATENT DOCUMENTS

| CN | 102337385 | 2/2012 |
| JP | S58207354 | 12/1983 |

(Continued)

OTHER PUBLICATIONS

Haitao et al., "Preparation and thermal conductivity of suspensions of graphite nanoparticles" Carbon, Jan. 2007, pp. 226-228, vol. 45, No. 1, Elsevier, Oxford, GB.

(Continued)

*Primary Examiner* — John A Hevey
(74) *Attorney, Agent, or Firm* — Davidson, Davidson & Kappel, LLC

(57) ABSTRACT

A method of heat treatment of a non-metallic or metallic item is provided. The method includes at least one step A) of heat transfer between the item and a heat transfer fluid A' including a fluid medium and nanoparticles. The heat transfer fluid has a heat transfer coefficient above the heat transfer coefficient of water. The method also includes at least one step B) of heat transfer between the item and a heat transfer fluid B' including a fluid medium and nanoparticles. The heat transfer fluid B' has a heat transfer coefficient different from the heat transfer coefficient of A' and above the heat transfer coefficient of water. The heat transfer fluids A' and B' are different.

28 Claims, 2 Drawing Sheets

(51) Int. Cl.
*C21D 1/60* (2006.01)
*C21D 1/667* (2006.01)
*C21D 1/56* (2006.01)
*C21D 1/00* (2006.01)

(56) References Cited

U.S. PATENT DOCUMENTS

| | | | |
|---|---|---|---|
| 2008/0302998 A1* | 12/2008 | Hong ................. | C09K 5/10 |
| | | | 252/74 |
| 2009/0065107 A1 | 3/2009 | Ho et al. | |
| 2009/0121396 A1* | 5/2009 | Serizawa ........... | B21B 45/0218 |
| | | | 266/44 |
| 2013/0341028 A1 | 12/2013 | Christian et al. | |
| 2019/0002749 A1* | 1/2019 | Noriega Perez ......... | C09K 5/10 |
| 2019/0002750 A1* | 1/2019 | Noriega Perez ......... | C09K 5/10 |
| 2020/0282454 A1* | 9/2020 | Cabanas Corrales .... | C21D 1/56 |

FOREIGN PATENT DOCUMENTS

| | | |
|---|---|---|
| JP | 2013028792 | 2/2013 |
| RU | 2359189 | 6/2009 |

OTHER PUBLICATIONS

Gopalan Ramesh et al, "Review of thermo-physical properties, wetting and heat transfer characteristics of nanofluids and their applicability in industrial quench heat treatment", Nanoscale Research Letters, (Jan. 1, 2011), vol. 6, No. 1, p. 334.

A Chennakesava Reddy, "Effects of Holding Temperature and Time for Austempering on Impact Toughness of Medium Carbon and High Alloy Steel", (Jan. 1, 2013), URL: http://www.ijcns.com/pdf/201.pdf, INternational Journal of Computer Network and Security (IJCNS) vol. 3, No. 1.

* cited by examiner

METHOD OF A HEAT TRANSFER OF A NON-METALLIC OR METALLIC ITEM

The present invention relates to a method of heat transfer of non-metallic or metallic item. In particular, it is well suited for steel, aluminum, stainless steel, copper, iron, copper alloys, titanium, cobalt, metal composite, nickel Industries or non-metallic industries such as plastics.

BACKGROUND

With a view of saving energy consumption, it is possible to improve the performance of heat exchangers systems and to introduce various heat transfer enhancement techniques. Some techniques have focused on electric or magnetic field application. Although an improvement in energy efficiency is possible from such points of view, an improvement can also be realized concerning the heat transfer fluid. Usually, fluids such as water, engine oil, ethylene glycol, etc. are used as heat transfer fluid. However, they have poor heat transfer performance and therefore high compactness and effectiveness of heat transfer systems are necessary to achieve required heat transfer. Among the efforts for enhancement of heat transfer, the application of additives to liquids is more noticeable.

For example, a surfactant such as LEVENOL C-421 which is polyoxyethylene mono- and di-glycerides, can be added into water for improving the heat transfer coefficient or at least the thermal conductivity. However, although the conductivity enhances in some cases, the presence of the surfactant results in the formation of foam. The presence of foam is a huge problem since it is really difficult to remove it, in particular in industrial scale. Moreover, the presence of a surfactant increases the corrosion of the heat transfer system, specially the pipe wherein the heat transfer fluid flows. Finally, scale can be formed particularly in the heat transfer system.

In steel making industry, for example the patent application US2003/0062147 discloses a method for manufacturing electrical steels. After the continuous casting, for producing grain oriented electrical steel from a cast strip, a rapid secondary cooling of the cast strip is realized to control the precipitation of the grain growth inhibiting phases.

Specifically, it describes a method for producing grain oriented electrical steel strip comprising the steps of:
(a) forming a continuously cast electrical steel strip having a thickness of no greater than about 10 mm,
(b) slow cooling with air at a rate of about 15° C./second said strip to a temperature of from about 1150 to about 1250° C. such that it becomes solidified and
(c) subsequently performing a rapid secondary cooling on said steel strip wherein the strip is cooled at a rate of from about 65 to about 150° C./second to a temperature of no greater than about 950° C.

The cooling process can be accomplished by the direct application of cooling sprays, directed cooling air/water mist, or impingement cooling of the cast strip onto solid media such as a metal belt or sheet.

However, with such cooling processes, it is possible not to reach the desired fast cooling. Indeed, the directed cooling air/water mist is a cooling difficult to control in industrial scale. Moreover, both cooling process are too long because the heat transfer flow between the cast strip and the cooling fluid or cooling solid is too low.

Another example is disclosed in a scientist publication called "Effect of Cooling Patterns on Microstructure and Mechanical Properties of Hot-Rolled Nb Microalloyed Multiphase Steel Plates" (Dong-sheng ZHENG, Fu-xian ZHU, Yan-mei LI, Bing-zhang CHEN, Journal of Iron and Steel Research, International, Volume 18, Issue 8, August 2011, Pages 46-52). It describes the effect of the run-out table cooling patterns on the microstructure and mechanical properties of Nb microalloyed steel plates which was investigated by hot rolling experiment. The results showed that the mixed microstructure containing ferrite, bainite and significant amounts of retained austenite can be obtained through three kinds of cooling patterns on the run-out table under the same hot rolling condition. For example, during the cooling process in a hot rolling process, the run-out table can cool the steel strip by the following steps:

(a') cooling from 820° C. to 700° C. at an intermediate cooling rate, the water used as coolant being in laminar regime flow, (b') cooling from 700° C. to 640° C. at a slow cooling rate, the air is used as coolant and (c') cooling from 640° C. to 440-460° C. at a ultra-fast cooling rate, the water being used as coolant.

However, in order to reach the desired cooling rate, a huge amount of water is needed for performing steps (a') and (c'). Additionally, there is a risk that the cooling steps using water take too much time in industrial scale. Indeed, the heat transfer coefficient of water is not high enough to quickly obtain an intermediate or ultra-fast cooling rate. Thus, a heat transfer fluid having high heat transfer coefficient is needed.

Recent investigations in nanotechnology have allowed the development of a new category of heat transfer fluid comprising nanoparticles. Such fluids also called "Nanofluid" are liquid suspension containing particles having at least one dimension below 100 nm. These heat transfer fluids have usually an increased heat transfer coefficient. These fluids are usually used as cooling fluid.

Such fluids can be used for accelerating the heat transfer, for example the cooling, between a non-metallic or metallic and a heat transfer fluid. For example, in steel making industry, during the cooling process in a hot rolling process, the run-out table cools the steel strip from approximately 800-950° C. at the entrance to 450-600° C. at the exit. Thus, for some steel grades, a heat transfer fluid having high heat transfer coefficient is needed.

However, sometimes, the cooling is performed in two or more steps, the cooling rate of each steps being fast but not equivalent. Thus, such method comprising several cooling steps is needed.

SUMMARY OF THE INVENTION

An object of the present invention is to provide an easy to implement method of heat treatment of a non-metallic or metallic item comprising at least two heat transfers between the item and the heat transfer fluids having heat transfer coefficients above the heat transfer coefficient of water. In particular, there is a need to provide a method wherein the heat transfer can be fast and controlled.

The present invention provides a method of heat treatment of a non-metallic or metallic item comprising at least one step A) of heat transfer between said item and a heat transfer fluid A' comprising a fluid medium and nanoparticles, the heat transfer fluid having a heat transfer coefficient above the heat transfer coefficient of water and at least one step B) of heat transfer between the item and a heat transfer fluid B' comprising a fluid medium and nanoparticles, the heat transfer fluid B' having a heat transfer coefficient different from the heat transfer coefficient of A' and above the heat transfer coefficient of water.

said heat transfer fluids A' and B' being different.

The following terms are defined:

heat transfer fluid comprising nanoparticles (so-called Nanofluid) means a liquid suspension containing particles having at least one dimension below 100 nm, laminar flow means a flow with a Reynolds number below a critical value of approximately 2300, turbulent flow means a flow with a Reynolds number larger than a critical value of about 4000, percolation threshold concentration is the concentration of nanoparticles above which they are connected forming a long-range network. For heat transfer applications, it is suitable that such network connects the hottest part, i.e. the part where the heat starts to flow, of the fluid and the coldest part of the fluid, i.e. the one where the heat is evacuated. In other words, below the Percolation threshold concentration, nanoparticles are not connected. When the Percolation threshold concentration is obtained, the network formed with nanoparticles, having higher thermal conductivity than the fluid medium, allows the heat carriers to take a path with much less thermal resistance, thus enhancing the thermal conductivity of the fluid, and therefore the heat transfer coefficient wt. % means percentage by weight, graphite nanoplatelets means a multilayered system of graphene sheets having a thickness around between 5 and 20 nm, few layers graphene means a multilayered system of graphene sheets having a thickness between 1 and 5 nm and graphene means a single-atom-thick sheet of hexagonally arranged, bonded carbon atoms, presenting usually a thickness below 1 nm.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

The invention relates to a method of heat treatment of a non-metallic or metallic item comprising:

A, at least one step A) of heat transfer between said item and a heat transfer fluid A' comprising a fluid medium and nanoparticles, the heat transfer fluid having a heat transfer coefficient above the heat transfer coefficient of water and B. at least one step B) of heat transfer between the item and a heat transfer fluid B' comprising a fluid medium and nanoparticles, the heat transfer fluid B' having a heat transfer coefficient different from the heat transfer coefficient of A' and above the heat transfer coefficient of water.

said heat transfer fluids A' and B' being different.

More preferably, the method also comprises at least one step C) of heat transfer between the item and a heat transfer fluid C' comprising a fluid medium and nanoparticles, the heat transfer fluid C' having a heat transfer coefficient below the heat transfer coefficient of water.

Advantageously, the method also comprises at least one step D) of heat transfer between the item and a heat transfer fluid D' comprising a fluid medium and nanoparticles, the heat transfer fluid D' having a heat transfer coefficient different from the heat transfer coefficient of C' and below the heat transfer coefficient of water.

According to the invention, the steps A), B), C), D) can be performed in any order, steps C and D being optional. In a preferred embodiment, the method of heat treatment according to the invention comprises steps A) and B) performed successively. In another preferred embodiment, step B) is performed before step A). Advantageously, the method of heat treatment according to the invention comprises steps A), B) and C) performed successively. They can also be performed in the following orders: B), C) and A) or C), A) and B). Preferably, the method of heat treatment according to the invention comprises steps A), B), C) and D) performed successively. They can also be performed in the following orders: B), C), A) and D) or A), C), D) and B).

In a preferred embodiment, the heat transfer fluid comprises nanoparticles chosen from graphite nanoplatelets, graphene, few layers graphene, $TiO_2$, $ZnO_2$, ZnO, Boron-nitride, copper, silica, montmorillonite, zeolite clipnoptilolite, wollastonite, mica, zeolite 4A, $Al_2O_3$, silicate, pumice, calcium oxide or carbon nanotubes. Preferably, the nanoparticles do not comprise carbon nanotubes.

For example, the nanoparticle can be spherical, elliptical or nanoplatelets.

Figure 1:
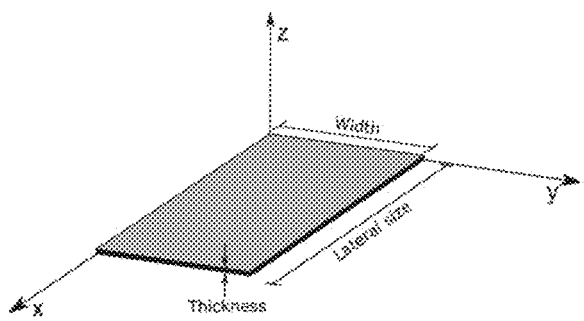
FIG. 1 illustrates an example of one nanoplatelet according to the present invention.

FIG. 1 illustrates an example of one nanoplatelet that can be used in the heat transfer fluid of the present invention. In this example, the lateral size means the highest length of the nanoplatelet through the X axis of and the thickness means the height of the nanoplatelet through the Z axis. The width of the nanoplatelet is illustrated through the Y axis.

Figure 2:
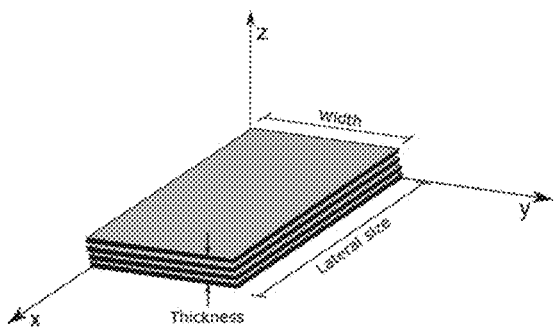
FIG. 2 illustrates an example of multilayered nanoplatelets according to the present invention.

FIG. 2 illustrates an example of multilayered nanoplatelets that can be used in the heat transfer fluid of the present invention. In this example, the lateral size means the highest length of the nanoplatelets through the X axis and the thickness means the total height of all the stacked nanoplatelets through the Z axis. The width of the nanoplatelet is illustrated through the Y axis.

Figure 3:
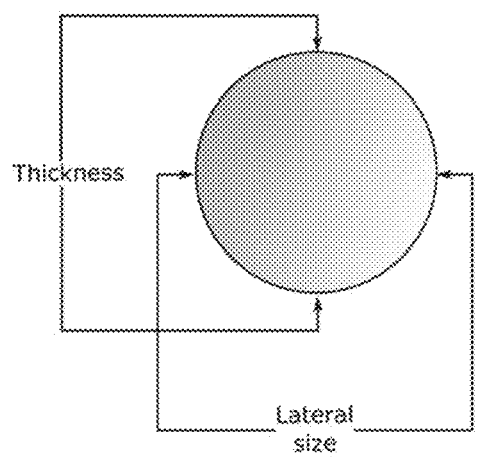
FIG. 3 illustrates an example of spherical nanoparticle according to the present invention.

FIG. 3 illustrates an example of spherical nanoparticle that can be used in the heat transfer fluid of the present invention. In this example, the lateral size means the diameter of the nanoparticle and the thickness means the height of the nanoparticle.

Figure 4:
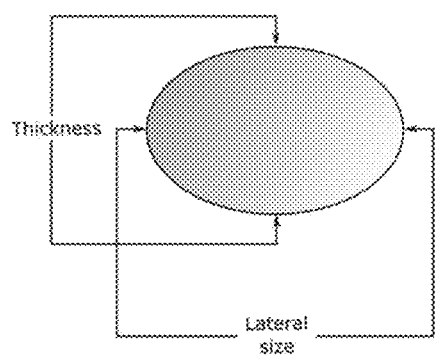
FIG. 4 illustrates an example of elliptical nanoparticle according to the present invention.

FIG. 4 illustrates an example of elliptical nanoparticle that can be used in the heat transfer fluid of the present invention. In this example, the lateral size means highest length of the nanoparticle and the thickness means the height of the nanoparticle.

The lateral size and the thickness of the nanoparticle can be measured by Scanning Electron Microscopy (SEM), Transmission Electron Microscopy (TEM) and Atomic Forces Microscopy (AFM).

Preferably, the nanoparticles are multilayered nanoplatelets. Indeed, without willing to be bound by any theory, it seems that to obtain nanoplatelets morphology, nanoparticles should have a multilayer structure with weak interaction between layers, i.e. Van der Waals, hydrogen bond, mechanical bond, halogen bond, pi stacking, cation/anion-pi bonds, intercalation, salt bridges and polar-pi. This weak bonding together with a good thermal conductivity of the nanoplatelets raises the possibility of improving heat transfer coefficient of a fluid.

Advantageously, the thickness of nanoparticles is between 1 and 99.99 nm, preferably between 5 to 50 nm and more preferably between 5 to 15 nm.

Preferably, the lateral size of the nanoparticle is between 26 and 50 μm, advantageously, between 35 and 45 μm.

Preferably, the nanoparticle concentration is between 0.01 wt. % and 12 wt. %, advantageously between 2 and 8 wt. % and more preferably between 4 and 7 wt. %.

In a preferred embodiment, the heat transfer fluid has a dispersing agent being a non-surface active polymer, a surfactant or a mixture thereof. The surfactant can be cationic, anionic, amphoteric or non-ionic.

For example, the dispersant agent can be polyvinnylpyrrolidone, polysaccharides, sulphated polysaccharides, linear alkylbenzene sulfonates, lignin sulfonates, di-alkyl sulfosuccinates, quaternary ammonium compounds, sodium stearate or a mixture thereof.

Preferably, the nanoparticles concentration/dispersing agent concentration ratio in weight is between 3 and 18. More preferably, the nanoparticles concentration/dispersing agent concentration ratio is between 4 and 15, advantageously between 4 and 8 and preferably being between 4 and 6.

Without willing to be bound by any theory, it seems that when the above ratio is controlled and the Percolation threshold concentration reached, the heat transfer fluid according to the invention allows for a higher thermal conductivity and therefore a higher heat transfer coefficient in laminar. Indeed, the dispersing agent would be able to avoid deposition and agglomeration of nanoparticles. For instance, if the dispersing agent is a surfactant, the nanoparticle would be enclosed by a micelle consisting in a core of hydrophobic molecules and a shell of hydrophilic molecules. Such micelle structure allows dispersing nanoparticles within the fluid. However to obtain percolation, in other words the formation of the long-range network formed by the nanoparticles, the degree of dispersion of nanoparticles has to be limited.

Preferably, the heat transfer fluid comprises a fluid medium chosen from water, ethylene glycol, ethanol, oil, methanol, silicone, propylene glycol, alkylated aromatics, liquid Ga, liquid In, liquid Sn, potassium formate or a mixture thereof. Gallium, Indium and Tin can be used as heat transfer fluid, in particular for the cooling of a metallic item. Indeed, the melting point of gallium is of 30° C., the one of indium is 157° C. and the one of tin is of 232° C. For example, they can be used to cool down computer chips or laboratory equipments such as neutron sources.

The heat transfer fluid is preferably manufactured by the following steps:

A, the provision of nanoparticles according to the present invention,

B. the provision of a fluid medium,

C. the adjustment of the nanoparticle concentration in order to achieve percolation and D. the mixing of the nanoparticles with the fluid medium.

According to the invention, the flow of the heat transfer fluid can be in a laminar or turbulent flow regime. In a laminar flow regime, the heat transfer coefficient is proportional to the thermal conductivity. On the contrary, in turbulent flow regime, the heat transfer coefficient depends on a set of thermo-physical properties such as viscosity.

According to the invention, the heat transfer step is between a metallic or non-metallic item and the heat transfer fluid. Preferably, the metallic item, being for example a metallic substrate, is made of aluminum, steel, stainless steel, copper, iron, copper alloys, titanium, cobalt, metal composite, nickel and the non-metallic is made of plastics.

In the prior art, the heat transferring using water as fluid medium can usually be realized by one mode. The mode is called "contact water" which means that water is used to cool or heat an object by being in direct contact with it.

According to a preferred embodiment of the invention, the item, being metallic, is a metallic substrate and the heat transfer fluid is directly in contact with it. In this case, the heat transfer can be realized by jet impingement cooling, pool boiling, spray cooling or micro-channel cooling.

For example, in the steel making industry, the heat transfer by contact water cooling can be implemented:

in sprays chambers of continuous casters and hot rolling process such as the cooling process on the run-out table, In coke ovens for gas treatment and quenching of coke, during the slag quenching in blast furnaces, basic oxygen furnaces and electric arc furnaces.

Preferably, the method of the heat treatment according to the invention further comprises at least one heating step. For example, the heating step is performed at a temperature between 0 to 1200° C.

The method according to the present invention can be used in the method for the manufacture of a multiphase steel as for instance Nb microalloyed steel plates during hot rolling in order to obtain a mixed microstructure containing ferrite, bainite and significant amounts of retained austenite. Such microstructure can be obtained through one cooling process on the run-out table. For example, during the cooling process in a hot rolling process, the run-out table can cool the steel strip by the following successive steps:

A, one cooling step of the steel strip with a heat transfer fluid A') comprising water and graphite nanoplatelets having a thickness/lateral size ratio of 0.00025. The nanoparticles concentration is 5 wt. %. The heat transfer enhancement with respect to the one of water is of 203% in laminar flow regime, C. one cooling step with a heat transfer fluid C') comprising water as a fluid medium and graphite nanoplatelets having a lateral size of 40 μm and a thickness of 10 nm, i.e a thickness/lateral size ratio of 0.00025. The concentration of the nanoparticles is 7 wt. %. The fluid further comprises 1 wt. % of polyvinnypyrolidone, the nanoparticles concentration/dispersing agent concentration ratio being of 7. The heat transfer reduction with respect to the one of water is of −53% in turbulent regime flow at 25° C. and B. one cooling step with a heat transfer fluid comprising graphite nanoplatelets having a thickness/lateral size ratio of 0.00025. The nanoparticles concentration is 7 wt. %. The fluid further comprises 1 wt. % of polyvinylpyrrolidone as dispersing agent, the nanoparticles concentration/dispersing agent concentration ratio being of 7. The heat transfer enhancement with respect to the one of water is of 286% in laminar flow regime.

Thus, heat transfer fluid A') and B') allows for a rapid cooling, the cooling of step B) being ultra-fast compared with the cooling of step A). The heat transfer fluid C') allows for a slow cooling. Moreover, all cooling steps are well controlled.

Example

Trials 1 to 3 were prepared by mixing nanographite multilayers having graphite nanoplatelets having a thickness/lateral size ratio of 0.00025. In trial 3, polyvinnylpyrrolidone as dispersing agent was added.

Trial 4 consisted of water.

For each trial, the thermal conductivity of the samples has been measured employing a DTC-25 thermal conductivity meter. The thermal conductivity enhancement was calculated with respect to the conductivity of water, the conductivity of water being of 0.67 W/mK at room temperature, i.e. 20° C.

In laminar flow, the heat transfer enhancement is similar to the enhancement of thermal conductivity, so no calculation is needed to have the heat transfer enhancement in %.

In turbulent flow, the heat transfer enhancement was calculated thanks to the following formula:

$$\frac{h_{nf}}{h_{bf}} = \left(\frac{k_{nf}}{k_{bf}}\right)^{3/5} \left(\frac{\rho_{nf}}{\rho_{bf}}\right)^{4/5} \left(\frac{C_{p,nf}}{C_{p,bf}}\right)^{2/5} \left(\frac{\mu_{nf}}{\mu_{bf}}\right)^{-2/5}$$

With $h_{nf}$: Heat transfer coefficient of nanofluids (J/s·K·m²), $h_{bf}$: Heat transfer coefficient of base fluid (J/s·K·m²), $k_{nf}$: Thermal conductivity of the nanofluids (J/s·K·m), $\rho_{nf}$: Density of the nanofluids (kg/m³), $C_{p,nf}$: Heat capacity of the nanofluids (J/kg·K) and $\mu_{nf}$: Viscosity of the nanofluids (kg/s·m).

| Trials | Fluid | thickness/lateral size ratio | Nanoparticles concentration (wt. %) | Dispersing agent (wt. %) | $C_{nanoP}/C_{disp}$ ratio | Heat transfer enhancement (%) |
|---|---|---|---|---|---|---|
| 1* | Water and graphite nanoplatelets | 0.00025 | 5 | — | — | 203 |
| 2* | Water and graphite nanoplatelets | 0.00025 | 7 | 1 | 7 | −53 |
| 3* | Water and graphite nanoplatelets | 0.00025 | 7 | 1 | 7 | 286 |

*according to the present invention.

The cooling performance of Trials 1 to 3 and Trial 4, consisting of water, was calculated thanks to a modeling software. In this test, a steel slab having a density of 7854 kg/m³ was cooled during 13 seconds. The length was of 5 meter, the width of 1 meter and the slab thickness was of 10 mm. The initial temperature of the slab was of 968° C.

On the one hand, the cooling of the slab was successively performed with Trials 1 to 3 as follows:

a first cooling step with Trial 1 in laminar flow regime, a second cooling step with Trial 2 in turbulent regime flow and a third cooling step with Trial 3 in laminar flow regime.

On the other hand, Trial 4 was used in laminar flow.

The following table shows the cooling rate by using each Trial:

| Trials | Cooling rate (° C./s) |
|---|---|
| 1* | 36.8 |
| 2* | 12.8 |
| 3* | 46.9 |
| 4 | 21.4 |

*according to present invention

Trial 1 and 3 allow for a rapid cooling, the cooling using Trial 3 being faster than the cooling with Trial 1. Trial 2 allows for a slow cooling. Thus, with the method according to the present invention, it is possible to obtain a multiphase steel compared to water, i.e. Trial 4.

What is claimed is:

1. A method of heat treatment of a non-metallic or metallic item comprising:

a first cooling step comprising transferring heat, in a laminar or turbulent regime flow, between a non-metallic or metallic item and a heat transfer fluid A' including a fluid medium and nanoparticles, the heat transfer fluid A' having a heat transfer coefficient above a heat transfer coefficient of water; and a second cooling step comprising transferring heat, in a laminar regime flow or a turbulent regime flow, between the item and a heat transfer fluid B' including a fluid medium and nanoparticles, the heat transfer fluid B' having a heat transfer coefficient different from the heat transfer coefficient of the heat transfer fluid A' and above the heat transfer coefficient of water;

the second cooling step performed before or after the first cooling step;

the heat transfer fluids A' and B' being different;

the heat transfer enhancement between the heat transfer coefficient of each of the heat transfer fluid A' and B' and the heat transfer coefficient of water being:

in the laminar flow, proportional to the thermal conductivity, and in the turbulent flow regime, satisfying the following formula:

$$\frac{h_{nf}}{h_{bf}} = \left(\frac{k_{nf}}{k_{bf}}\right)^{3/5} \left(\frac{\rho_{nf}}{\rho_{bf}}\right)^{4/5} \left(\frac{C_{p,nf}}{C_{p,bf}}\right)^{2/5} \left(\frac{\mu_{nf}}{\mu_{bf}}\right)^{-2/5}$$

wherein $h_{nf}$ is heat transfer coefficient of the heat transfer fluid (J/s·K·m²), $h_{bf}$ is heat transfer coefficient of water (J/s·K·m²), $k_{nf}$ is thermal conductivity of the heat transfer fluid measured at room temperature (J/s·K·m), $\rho_{nf}$ is density of the heat transfer fluid (kg/m³), $C_{p,nf}$ is heat capacity of the heat transfer fluid (J/kg·K) and $\mu_{nf}$ is viscosity of the heat transfer fluid (kg/s·m).

2. The method according to claim 1, further comprising the step of:
    transferring heat between the item and a heat transfer fluid C' including a fluid medium and nanoparticles, the heat transfer fluid C' having a heat transfer coefficient below the heat transfer coefficient of water;
    the heat transfer enhancement between the heat transfer coefficient of the heat transfer fluid C' and the heat transfer coefficient of water being:
    in the laminar flow, proportional to the thermal conductivity, and
    in the turbulent flow regime, satisfying the following formula:

$$\frac{h_{nf}}{h_{bf}} = \left(\frac{k_{nf}}{k_{bf}}\right)^{3/5} \left(\frac{\rho_{nf}}{\rho_{bf}}\right)^{4/5} \left(\frac{C_{p,nf}}{C_{p,bf}}\right)^{2/5} \left(\frac{\mu_{nf}}{\mu_{bf}}\right)^{-2/5}$$

wherein $h_{nf}$ is heat transfer coefficient of the heat transfer fluid (J/s·K·m$^2$), $h_{bf}$ is heat transfer coefficient of water (J/s·K·m$^2$), $k_{nf}$ is thermal conductivity of the heat transfer fluid measured at room temperature (J/s·K·m), $\rho_{nf}$ is density of the heat transfer fluid (kg/m$^3$), $C_{p,nf}$ is heat capacity of the heat transfer fluid (J/kg·K) and $\mu_{nf}$ is viscosity of the heat transfer fluid (kg/s·m).

3. The method according to claim 2, further comprising the step of:
    transferring heat between the item and a heat transfer fluid D' including a fluid medium and nanoparticles, the heat transfer fluid D' having a heat transfer coefficient different from the heat transfer coefficient of the heat transfer fluid C' and below the heat transfer coefficient of water,
    the heat transfer enhancement between the heat transfer coefficient of the heat transfer fluid D' and the heat transfer coefficient of water being:
    in the laminar flow, proportional to the thermal conductivity, and
    in the turbulent flow regime, satisfying the following formula:

$$\frac{h_{nf}}{h_{bf}} = \left(\frac{k_{nf}}{k_{bf}}\right)^{3/5} \left(\frac{\rho_{nf}}{\rho_{bf}}\right)^{4/5} \left(\frac{C_{p,nf}}{C_{p,bf}}\right)^{2/5} \left(\frac{\mu_{nf}}{\mu_{bf}}\right)^{-2/5}$$

wherein $h_{nf}$ is heat transfer coefficient of the heat transfer fluid (J/s·K·m$^2$), $h_{bf}$ is heat transfer coefficient of water (J/s·K·m$^2$), $k_{nf}$ is thermal conductivity of the heat transfer fluid measured at room temperature (J/s·K·m), $\rho_{nf}$ is density of the heat transfer fluid (kg/m$^3$), $C_{p,nf}$ is heat capacity of the heat transfer fluid (J/kg·K) and $\mu_{nf}$ is viscosity of the heat transfer fluid (kg/s·m).

4. The method according to claim 1, wherein the heat transfer fluid A' or B' includes nanoparticles selected from a group consisting of: graphite nanoplatelets, graphene, few layers graphene, TiO$_2$, ZnO$_2$, ZnO, Boron-nitride, copper, silica, montmorillonite, zeolite clipnoptilolite, wollastonite, mica, zeolite 4A, Al$_2$O$_3$, silicate, pumice, calcium oxide or carbon nanotubes or any mixture thereof.

5. The method according to claim 1, wherein the nanoparticles do not include carbon nanotubes.

6. The method according to claim 1, wherein the nanoparticles are multilayered nanoplatelets.

7. The method according to claim 1, wherein a thickness of the nanoparticles is from 1 to 99.99 nm.

8. The method according to claim 7, wherein the thickness of the nanoparticles is from 5 to 50 nm.

9. The method according to claim 8, wherein the thickness of the nanoparticles is from 5 to 15 nm.

10. The method according to claim 1, wherein a lateral size of the nanoparticles is from 26 to 50 μm.

11. The method according to claim 10, wherein the lateral size is from 35 to 45 μm.

12. The method according to claim 11, wherein the nanoparticles concentration is from 0.01 to 12 wt. %.

13. The method according to claim 12, wherein the nanoparticles concentration is from 2 to 8 wt. %.

14. The method according to claim 13, wherein the nanoparticles concentration is from 4 to 7 wt. %.

15. The method according to claim 1, wherein the heat transfer fluid A' or B' includes a dispersing agent.

16. The method according to claim 15, wherein the dispersing agent is a non-surface active polymer or a surfactant or a mixture thereof.

17. The method according to claim 16, wherein the surfactant is cationic, anionic, amphoteric or non-ionic.

18. The method according to claim 15, wherein the dispersing agent is selected from a group consisting of: polyvinnylpyrrolidone, polysaccharides, sulphated polysaccharides, linear alkylbenzene sulfonates, lignin sulfonates, di-alkyl sulfosuccinates, quaternary ammonium compounds and sodium stearate or a mixture thereof.

19. The method according to claim 15, wherein a nanoparticles concentration/dispersing agent concentration ratio in weight is from 3 to 18.

20. The method according to claim 1, wherein the fluid medium of the heat transfer fluid A' or the heat transfer fluid B' is selected from a group consisting of: water, ethylene glycol, ethanol, oil, methanol, silicone, propylene glycol, alkylated aromatics, liquid Ga, liquid In, liquid Sn, potassium formate and any mixture thereof.

21. The method according to claim 1, wherein the heat transfer fluid A' or B' is in the turbulent regime flow.

22. The method according to claim 1, wherein the item is metallic and is made of aluminum, steel, stainless steel, copper, iron, copper alloys, titanium, cobalt, metal composite or nickel.

23. The method according to claim 1, wherein the item is a metallic substrate and the heat transfer is such that the heat transfer fluid A' or B' is directly in contact with the metallic substrate.

24. The method according to claim 23, wherein the contact between the metallic substrate and the heat transfer fluid A' or B' is realized though jet impingement cooling, pool boiling, spray cooling or micro-channel cooling.

25. The method according to claim 1, further comprising the step of:
    heating the item.

26. The method according to claim 25, wherein the heating step is performed at a temperature between 0 and 1200° C.

27. A method of heat treatment of a non-metallic or metallic item comprising:
    a cooling step comprising transferring heat, in a laminar or turbulent regime flow, between a non-metallic or metallic item and a heat transfer fluid A' including a fluid medium and nanoparticles, the heat transfer fluid A' having a heat transfer coefficient above a heat transfer coefficient of water;
    a cooling step comprising transferring heat, in a laminar regime flow or a turbulent regime flow, between the item and a heat transfer fluid B' including a fluid medium and nanoparticles, the heat transfer fluid B' having a heat transfer coefficient different from the heat transfer coefficient of the heat transfer fluid A' and above the heat transfer coefficient of water; and a step of transferring heat between the item and a heat transfer fluid C' including a fluid medium and nanoparticles, the heat transfer fluid C' having a heat transfer coefficient below the heat transfer coefficient of water;

the heat transfer fluids A' and B' being different;

the heat transfer enhancement between the heat transfer coefficient of each of the heat transfer fluid A', B' and C' and the heat transfer coefficient of water being:

in the laminar flow, proportional to the thermal conductivity, and in the turbulent flow regime, satisfying the following formula:

$$\frac{h_{nf}}{h_{bf}} = \left(\frac{k_{nf}}{k_{bf}}\right)^{3/5}\left(\frac{\rho_{nf}}{\rho_{bf}}\right)^{4/5}\left(\frac{C_{p,nf}}{C_{p,bf}}\right)^{2/5}\left(\frac{\mu_{nf}}{\mu_{bf}}\right)^{-2/5}$$

wherein $h_{nf}$ is heat transfer coefficient of the heat transfer fluid (J/s·K·m$^2$), $h_{bf}$ is heat transfer coefficient of water (J/s·K·m$^2$), $k_{nf}$ is thermal conductivity of the heat transfer fluid measured at room temperature (J/s·K·m), $\rho_{nf}$ is density of the heat transfer fluid (kg/m$^3$), $C_{p,nf}$ is heat capacity of the heat transfer fluid (J/kg·K) and $\mu_{nf}$ is viscosity of the heat transfer fluid (kg/s·m).

28. The method according to claim 27, further comprising the step of:

transferring heat between the item and a heat transfer fluid D' including a fluid medium and nanoparticles, the heat transfer fluid D' having a heat transfer coefficient different from the heat transfer coefficient of the heat transfer fluid C' and below the heat transfer coefficient of water, the heat transfer enhancement between the heat transfer coefficient of the heat transfer fluid D' and the heat transfer coefficient of water being:

in the laminar flow, proportional to the thermal conductivity, and in the turbulent flow regime, satisfying the following formula:

$$\frac{h_{nf}}{h_{bf}} = \left(\frac{k_{nf}}{k_{bf}}\right)^{3/5}\left(\frac{\rho_{nf}}{\rho_{bf}}\right)^{4/5}\left(\frac{C_{p,nf}}{C_{p,bf}}\right)^{2/5}\left(\frac{\mu_{nf}}{\mu_{bf}}\right)^{-2/5}$$

wherein $h_{nf}$ is heat transfer coefficient of the heat transfer fluid (J/s·K·m$^2$), $h_{bf}$ is heat transfer coefficient of water (J/s·K·m$^2$), $k_{nf}$ is thermal conductivity of the heat transfer fluid measured at room temperature (J/s·K·m), $\rho_{nf}$ is density of the heat transfer fluid (kg/m$^3$), $C_{p,nf}$ is heat capacity of the heat transfer fluid (J/kg·K) and $\mu_{nf}$ is viscosity of the heat transfer fluid (kg/s·m).

* * * * *